United States Patent
Fancher, III (10) Patent No.: US 8,069,639 B2
(45) Date of Patent: Dec. 6, 2011

(54) WHEEL HEIGHT ADJUSTER FOR WALK-BEHIND MOWER

(75) Inventor: Robert Fancher, III, Columbia, SC (US)

(73) Assignee: Husqvarna Outdoor Products Inc., Augusta, GA (US)

( * ) Notice: Subject to any disclaimer, the term of this patent is extended or adjusted under 35 U.S.C. 154(b) by 50 days.

(21) Appl. No.: 12/260,617

(22) Filed: Oct. 29, 2008

(65) Prior Publication Data
US 2010/0102525 A1  Apr. 29, 2010

(51) Int. Cl.
*A01D 34/00* (2006.01)
(52) U.S. Cl. ........................................ 56/17.2
(58) Field of Classification Search ............ 56/17.1, 56/17.2, 320.1
See application file for complete search history.

(56) References Cited

U.S. PATENT DOCUMENTS

| | | | | |
|---|---|---|---|---|
| 2,776,844 A * | 1/1957 | Wilkin | ....................... | 280/43.2 |
| 2,909,884 A | 10/1959 | Knarzer | | |
| 2,915,318 A * | 12/1959 | Chesser | ....................... | 280/43 |
| 3,269,100 A | 8/1966 | Smith | | |
| 3,357,715 A * | 12/1967 | Plamper et al. | ....................... | 280/43.13 |
| 3,677,574 A * | 7/1972 | Cyr | ....................... | 280/43.13 |
| 3,872,654 A | 3/1975 | Brundage et al. | | |
| 3,874,151 A * | 4/1975 | Seifert et al. | ....................... | 56/17.2 |
| 3,977,163 A | 8/1976 | Olin et al. | | |
| 4,006,580 A * | 2/1977 | Kalleicher | ....................... | 56/17.2 |
| 4,167,093 A * | 9/1979 | Pfeiffer et al. | ....................... | 56/17.2 |
| 4,224,785 A | 9/1980 | Hoch | | |
| 4,321,784 A | 3/1982 | Wood et al. | | |
| 4,785,612 A | 11/1988 | Morishita et al. | | |
| 4,835,952 A * | 6/1989 | McLane | ....................... | 56/17.2 |
| 4,905,463 A * | 3/1990 | Eilles | ....................... | 56/17.2 |
| 5,156,217 A | 10/1992 | Hirata et al. | | |
| 5,526,633 A | 6/1996 | Strong et al. | | |
| 5,528,886 A | 6/1996 | Esau | | |
| 5,606,851 A * | 3/1997 | Bruener et al. | ....................... | 56/11.9 |
| 5,749,209 A | 5/1998 | Thomason | | |
| 6,041,584 A * | 3/2000 | Hohnl | ....................... | 56/17.2 |
| 6,378,280 B1 * | 4/2002 | Bone et al. | ....................... | 56/17.1 |
| 6,729,116 B1 | 5/2004 | Graus et al. | | |
| 7,240,470 B2 | 7/2007 | Clement et al. | | |
| 7,293,398 B2 | 11/2007 | Koehn | | |
| 7,716,907 B2 * | 5/2010 | Joliff et al. | ....................... | 56/17.2 |

* cited by examiner

*Primary Examiner* — Thomas Will
*Assistant Examiner* — Mai Nguyen
(74) *Attorney, Agent, or Firm* — Nelson Mullins Riley & Scarborough LLP (57) ABSTRACT

A mower is provided that includes a height-adjuster assembly that adjustably connects the ground engaging wheel to the housing of the mower at an adjustable height from the ground. The height-adjuster assembly includes a bracket fixed to the housing, an arm, a sleeve, a wheel mount, a pin, and a handle. The arm is rotatably mounted relative to the housing and the bracket about a pivot point. The sleeve is fixed to the arm for rotation with the arm relative to the housing and the bracket about the pivot point. A handle overlays the pin and the sleeve. The handle is configured to be grasped by a user for movement along a first direction to move the pin from a first position into a second position. Upon reaching the second position, the handle and the sleeve can be rotated to rotate the ground engaging wheel relative to the housing.

11 Claims, 6 Drawing Sheets

WHEEL HEIGHT ADJUSTER FOR WALK-BEHIND MOWER

BACKGROUND OF THE INVENTION

The present invention relates generally to a wheel height adjuster, and more particularly to a wheel height adjuster assembly for a mower.

It is generally known in the prior art to provide wheel height adjusters that require large forces, such as by the deforming of steel, to change the height of a mower.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect of the present invention, a mower is provided that has an adjustable cutting height. The mower includes a housing, a cutting assembly, a motor, a ground engaging wheel, and a height-adjuster assembly. The cutting assembly is operatively located within the housing. The motor is operatively mounted upon the housing for powering the cutting assembly. The height-adjuster assembly adjustably connects the ground engaging wheel to the housing for supporting the housing, the associated cutting assembly, and the motor, at an adjustable height from the ground. The height-adjuster assembly includes a bracket fixed to the housing, an arm, a sleeve, a wheel mount, a pin, and a handle. The bracket is stationary and the bracket has a plurality of retainer locations. The arm is rotatably mounted relative to the housing and the bracket about a pivot point. The sleeve is fixed to the arm for rotation with the arm relative to the housing and the bracket about the pivot point. The wheel mount is operatively connected to the arm at a first distance from the pivot point with the ground engaging wheel operatively mounted to the wheel mount. Rotational movement of the sleeve about the pivot point rotates the arm to move in an arc and accordingly displaces the wheel mount and the ground engaging wheel for adjustment of position of the ground engaging wheel relative to the housing. The sleeve has a hollow interior extending from a manually operable end portion of the sleeve to a portion of the sleeve directed toward the bracket fixed to the housing. The pin is located within the interior of the sleeve and movable relative to the sleeve in response to manual actuation, where the pin has a first position relative to the sleeve in which an end portion of the pin is engaged with one of the plurality of retainer locations on the bracket to prevent movement of the sleeve, the arm, the wheel mount and the ground engaging wheel relative to the housing. The pin has a second position relative to the sleeve in which the end portion of the pin is not engaged with one of the plurality of retainer locations on the bracket to permit rotatable movement of the sleeve, the arm, the wheel mount and the ground engaging wheel relative to the housing. A handle overlays the pin and the sleeve at the manually operable end portion where the handle is secured to a top portion of the pin. The handle is configured to be grasped by a user for movement along a first direction where the movement of the handle along the first direction is configured to provide the manual actuation to move the pin from the first position into the second position where the pin is not received within any of the plurality of retainer locations. The sleeve is located on a first line that begins at the manually operable end portion and ends at the pivot point and the first line is located at an angle relative to a second line that begins at the pivot point and ends at the location of the wheel mount.

In accordance with another aspect of the present invention, a mower is provided that has an adjustable cutting height. The mower includes a housing, a cutting assembly, a motor, a ground engaging wheel, and a height-adjuster assembly. The cutting assembly is operatively located within the housing. The motor is operatively mounted upon the housing for powering the cutting assembly. The height-adjuster assembly adjustably connects the ground engaging wheel to the housing for supporting the housing, the associated cutting assembly, and the motor, at an adjustable height from the ground. The height-adjuster assembly includes a bracket fixed to the housing, an arm, a sleeve, a wheel mount, a pin, a handle, a spring mechanism, and a flange located on the arm. The bracket is stationary and the bracket has a plurality of retainer locations. The arm is rotatably mounted relative to the housing and the bracket about a pivot point. The sleeve is fixed to the arm for rotation with the arm relative to the housing and the bracket about the pivot point. The wheel mount is operatively connected to the arm at a first distance from the pivot point with the ground engaging wheel operatively mounted to the wheel mount. Rotational movement of the sleeve about the pivot point rotates the arm to move in an arc and accordingly displaces the wheel mount and the ground engaging wheel for adjustment of position of the ground engaging wheel relative to the housing. The sleeve has a hollow interior extending from a manually operable end portion of the sleeve to a portion of the sleeve directed toward the bracket fixed to the housing. The pin is located within the interior of the sleeve and movable relative to the sleeve in response to manual actuation, where the pin has a first position relative to the sleeve in which an end portion of the pin is engaged with one of the plurality of retainer locations on the bracket to prevent movement of the sleeve, the arm, the wheel mount and the ground engaging wheel relative to the housing. The pin has a second position relative to the sleeve in which the end portion of the pin is not engaged with one of the plurality of retainer locations on the bracket to permit rotatable movement of the sleeve, the arm, the wheel mount and the ground engaging wheel relative to the housing. A handle overlays the pin and the sleeve at the manually operable end portion where the handle is secured to a top portion of the pin. The handle is configured to be grasped by a user for movement along a first direction where the movement of the handle along the first direction is configured to provide the manual actuation to move the pin from the first position into the second position where the pin is not received within any of the plurality of retainer locations. The spring mechanism is included within the handle to bias the pin within the interior of the sleeve into the first position to be received within one of the plurality of retainer locations. The sleeve is located on a first line that begins at the manually operable end portion and ends at the pivot point and the first line is located at an angle relative to a second line that begins at the pivot point and ends at the location of the wheel mount. The flange receives a portion of the sleeve such that the arm is configured to rotatably move about the pivot point as the sleeve rotatably moves about the pivot point.

In accordance with another aspect of the present invention, a method of assembling and adjusting a wheel height adjustment mechanism for a mower includes the steps of providing a housing for a cutting assembly and a motor mounted upon the housing for powering the cutting assembly, providing a ground engaging wheel for the housing, mounting a bracket to the housing, and rotatably mounting an arm relative to the housing and the bracket about a pivot point. The method also includes the steps of fixing a sleeve to the arm for rotation with the arm relative to the housing and the bracket about the pivot point, mounting a wheel mount on the arm at a first distance from the pivot point, inserting a pin biased by a spring mechanism into an interior of the sleeve where the pin is configured to move within the interior of the sleeve, and snapping a handle into engagement around the pin. Another step in the method is to grasp the handle and movie the handle in a first direction to move the handle and the pin located within the handle from a first position to a second position. The first position corresponds to an end portion of the pin being received in one of a plurality of retainer locations on the bracket to prevent movement of the sleeve, the arm, the wheel mount, and the ground engaging wheel. The second position corresponds to the end portion of the pin not being received within any of the plurality of retainer locations on the bracket to permit rotatable movement of the sleeve, the arm, the wheel mount, and the ground engaging wheel. Another step in the method is to rotatably move the sleeve from a first rotatable position to a second rotatable position while the pin is in the second position such that the handle, the sleeve, the pin, the arm, the wheel mount, and the ground engaging wheel can be rotated together to the second rotatable position about the pivot point such that a desired height for the wheel mount and the ground engaging wheel is reached. Another step in the method is to release the handle such that the handle moves in a direction opposite the first direction and the pin returns to the first position where the pin is received in one of the plurality of retainer locations on the bracket to secure the wheel mount in the second rotatable position and prevent movement of the sleeve, the arm, the wheel mount, and the ground engaging wheel.

BRIEF DESCRIPTION OF THE SEVERAL VIEWS OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Figure 1:
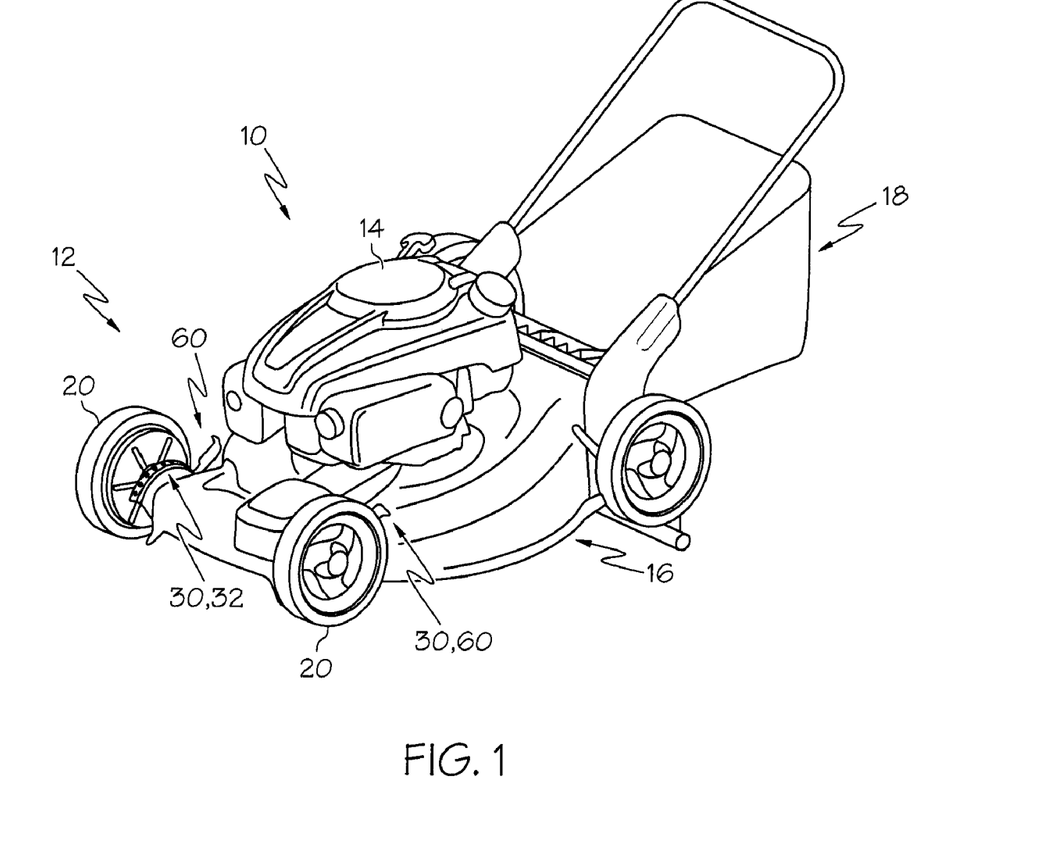
FIG. 1 is a perspective view of a lawnmower that includes a first example height-adjuster assembly.

As shown in the example of FIG. 1, an example mower 10 is shown that is configured for cutting grass. The example mower 10 includes a mower body 12 which can include a motor 14 or other power source, a housing 16, and a mower blade. The housing 16 can be a mower deck. The motor 14 can be operatively supported upon the housing 16 and the motor 14 supplies a motive force for a mowing operation for powering the mower blade or other cutting assembly. In other examples, the motor 14 can be located in other locations. At least a portion of the mower 10 is operable by electrical energy, such as by the motor 14 being an electric motor 14 or by providing an electric starter that requires a battery. The mower 10 of FIG. 1 includes a collection bag 18 to house grass that has been cut, though it is appreciated that a rear or side discharge structure or other type of discharge structure can be used with the subject invention. It is also appreciated that such other configurations of a mower 10 can also be used in association with the subject invention.

A cutting assembly is operatively located within the housing 16. At least one ground engaging wheel 20 is provided for the mower 10. The ground engaging wheel 20 is configured for supporting the housing 16. The ground engaging wheel 20 also supports the associated cutting assembly, and the motor 14 at a height from the ground. In this example, the mower 10 is provided with four wheels. In FIG. 1, the mower 10 shown has an example of a height-adjuster assembly 30, located on both of the front ground engaging wheels 20. The height-adjuster assembly 30 is provided for adjustably connecting the ground engaging wheel 20 to the housing 16. An adjustment of the ground engaging wheel 20 relative to the housing 16 will result in different distances between the cutting assembly of the mower and the ground to provide an adjustable cutting height. Accordingly, the height-adjuster assembly 30 adjustably connects the ground engaging wheel 20 to the housing 16 for supporting the housing 16, the associated cutting assembly, and the motor 14, at an adjustable height from the ground. It is appreciated that a height-adjuster assembly 30 can be located on each of the four wheels of the mower.

Figure 2:
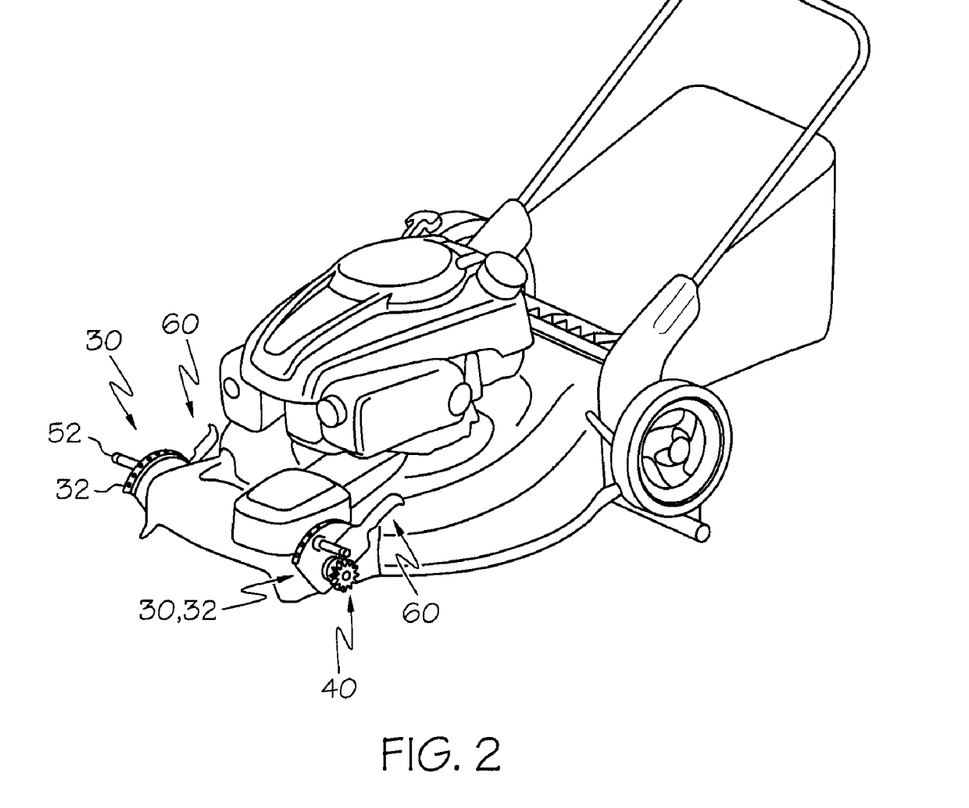
FIG. 2 is a perspective view of the first example height-adjuster assembly of FIG. 1 as it is attached to a lawnmower.

In FIG. 2, the front ground engaging wheels 20 from FIG. 1 are removed to show the height-adjuster assembly 30 as it is mounted on the example mower 10. The height-adjuster assembly 30 includes a bracket 32 that is fixed to the housing 16, a wheel mount 52 for mounting the ground engaging wheel, and a handle 60 for adjusting the height of each ground engaging wheel by rotating the handle 60 and the associated wheel mount 52 about a pivot point 40. A user can operate the height-adjuster assembly 30 by grasping the handle 60 to adjust the height of each ground engaging wheel relative to the housing 16.

Figure 3:
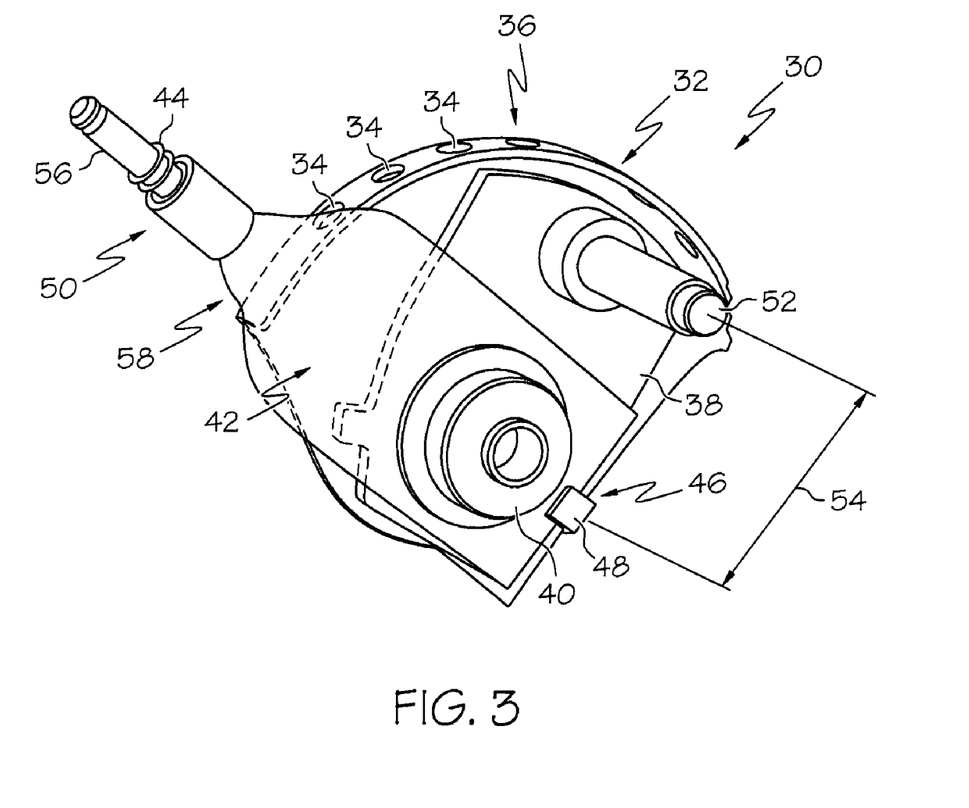
FIG. 3 is a front view of the first example height-adjuster assembly of FIG. 1.

As shown in FIG. 3, a view of the height-adjuster assembly 30 used on the right side of the mower 10 of FIG. 1 is shown. The height-adjuster assembly 30 includes the bracket 32 that is fixed to the housing 16. The bracket 32 is fixed to the housing 16 of the mower 10 and does not move when the handle 60 is rotated. The bracket 32 includes a plurality of retainer locations 34. The plurality of retainer locations 34 can be located on a top surface 36 of the bracket 32. In other examples, the retainer locations are located on other surfaces of the bracket 32. An arm 38 can be rotatably mounted relative to the housing 16 and the bracket 32 about a pivot point 40.

A sleeve 42 can be fixed to the arm 38 for rotation with the arm 38 relative to the housing 16 and the bracket 32 about the pivot point 40. The sleeve 42 is located on a first line that extends between a manually operable end portion 50 and the pivot point 40. A second line begins at the pivot point 40 and ends at the location of the wheel mount 52. The first line can be located at an angle relative to the second line. The handle 60, shown in FIG. 2, is attached around the manually operable end portion 50 of the sleeve 42. The sleeve 42 can have an interior that is hollow at some portions. For example, the sleeve 42 can be hollow between the manually operable end portion 50 and a portion of the sleeve that is directed towards the bracket 32. The sleeve 42 can extend from a first end 44 to a second end 46. The sleeve 42 can have a hollow interior extending from the manually operable end portion 50 of the sleeve 42 to a portion of the sleeve 42 directed toward the bracket 32 fixed to the housing 16.

The wheel mount 52 can be operatively connected to the arm 38 at a first distance 54 from the pivot point 40. The first distance 54 between the wheel mount 52 and the pivot point 40 provides a greater height adjustment for each increment of movement of the handle 60. For example, the greater the distance the wheel mount 52 is from the pivot point 40, the greater the change in wheel height is for each increment of movement of the handle 60. The ground engaging wheel 20 is mounted on the wheel mount 52. The rotational movement of the sleeve 42 about the pivot point 40 rotates the arm 38 to move in an arc and accordingly displaces the wheel mount 52 and the ground engaging wheel 20. The displacement of the wheel mount 52 provides an adjustment of a position of the ground engaging wheel 20 relative to the housing 16. A pin 56, shown can be located within the interior of the sleeve 42 and movable relative to the sleeve 42 in response to the manual actuation of the handle 60.

Figure 4:
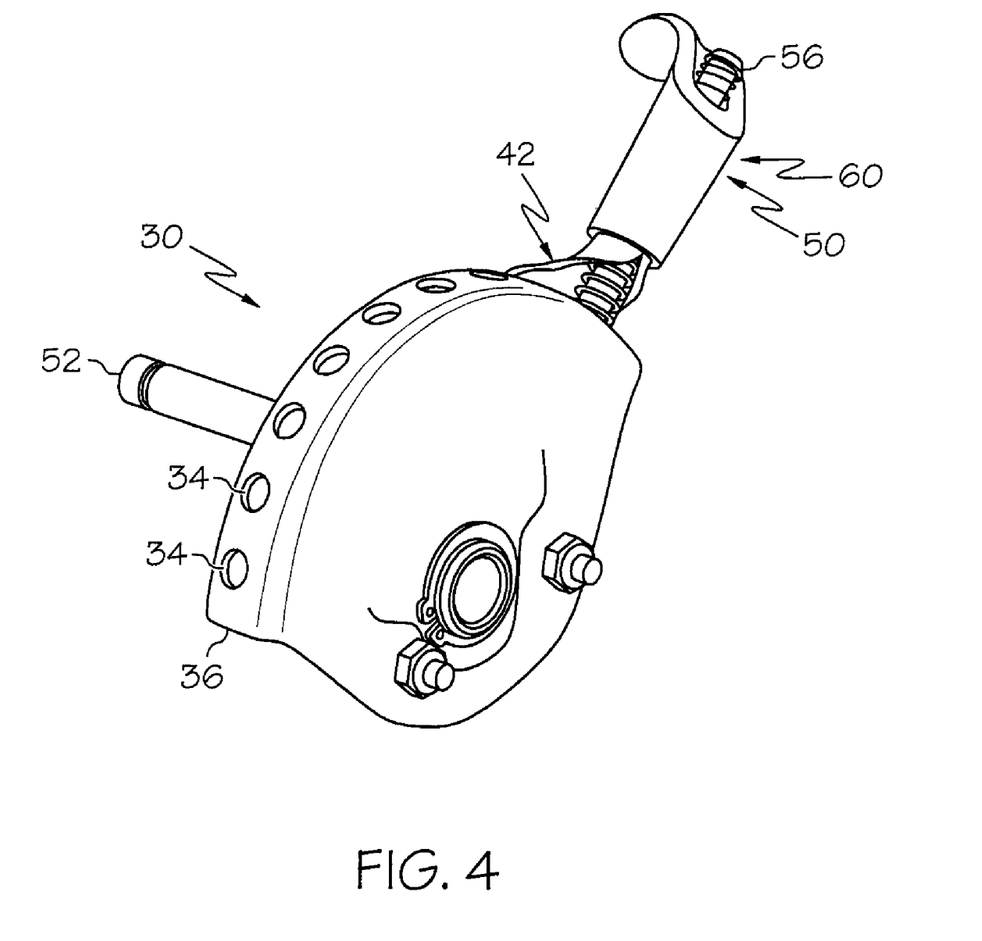
FIG. 4 is a rear view of the first example height-adjuster assembly of FIG. 1.

FIG. 4 shows the height-adjuster assembly 30 from a view with an opposite perspective from FIG. 3. As shown in FIG. 4, a handle 60 can overlay the pin 56 and the sleeve 42 at a manually operable end portion 50 of the sleeve 42. The handle 60 can be secured to a top portion of the pin 56, where the handle 60 is configured to be grasped by a user for movement along a first direction by manual actuation. The first direction can be along the first line between the manually operable end portion 50 and the pivot point 40. In further examples, the handle 60 can be secured to the top portion of the pin 56 by engagement of a snap feature located on one of the pin 56 and the handle 60. The handle 60 can be snapped into engagement around the pin 56. In other examples, a fastener can be used to secure the pin 56 to the handle 60. The handle 60 is configured to move the pin 56 from a first position into a second position. In FIG. 3 and FIG. 4, the handle 60 and the pin 56 are in a first position where the pin 56 is received within one of the plurality of retainer locations 34.

Figure 5:
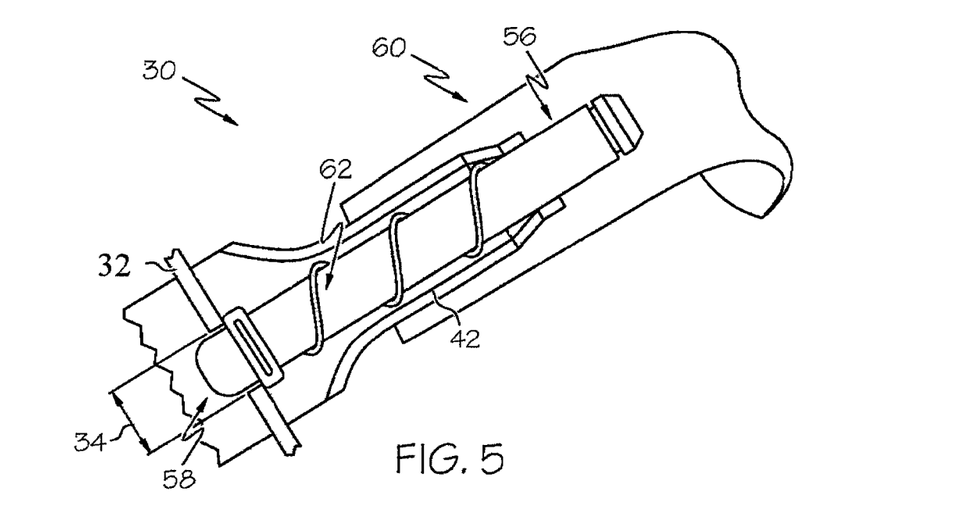
FIG. 5 is a sectional view of the handle of FIG. 4 in a first position.

The movement of the handle 60, such as by the manual actuation of the handle 60 of a user pulling the handle 60 along the first direction, moves the pin 56 from a first position into a second position where the pin 56 is no longer received within one of the plurality of retainer locations 34. The first position of the pin 56 relative to the sleeve 42 is shown in FIG. 5. In the first position, an end portion 58 of the pin 56 is engaged with one of the plurality of retainer locations 34 on the bracket 32 to prevent movement of the sleeve 42, the arm 38, the wheel mount 52 and the ground engaging wheel 20 relative to the housing 16. The pin 56 can have a second position, shown in FIG. 6, relative to the sleeve 42 in which the end portion 58 of the pin 56 is not engaged with one of the plurality of retainer locations 34 on the bracket 32 to permit rotatable movement of the sleeve 42, the arm 38, the wheel mount 52 and the ground engaging wheel 20 relative to the housing 16. In the second position, shown in FIG. 6, the pin 56 is not received within any of the plurality of retainer locations 34. Once the pin 56 is no longer received within one of the plurality of retainer locations 34, the handle 60 and the wheel mount 52 that has a ground engaging wheel 20 attached to it can be rotated to a desired position for the height of the mower.

With a user pulling the handle 60 along the first direction, the angle between the first line, beginning at the pivot point 40 and ending at the location of the wheel mount 52, and the second line, beginning at the pivot point 40 and ending at the location of the wheel mount 52, allows the handle 60 to be in a more user-friendly position. For example, if there was no angle between the first line and the second line, the handle 60 would be located closer to the ground when the housing 16 for the mower is at its highest position, where the wheel mount 52 is at its lowest position. This position of the handle 60 would cause the user to pull the handle 60 in an almost horizontal direction. The user would have to bend farther down to perform such a movement. This would cause the user more difficulty when the handle 60 has to be manually actuated from the first position to the second position. Instead, by providing an angle between the first line and the second line, each of the rotatable positions of the handle 60 can be located such that the handle 60 is oriented closer to a vertical direction. These orientations of the handle 60 allow a user to pull in a direction that is more vertical on the handle 60 which is easier for a user.

A spring mechanism 62 can be included within the handle 60, as shown in FIG. 5. The spring mechanism 62 is configured to bias the pin 56 within the interior of the sleeve 42 into the first position to be received within one of the plurality of retainer locations 34. Other devices can be used to bias the pin 56 within the interior of the sleeve 42 into the first position. Providing a bias allows a user operating the height-adjuster assembly to have the pin 56 and the handle 60 fall into place once the pin 56 is lined up with a retainer location 34.

The first example height-adjuster assembly 30 can also further include a flange 48, shown in FIG. 3, which can be located on the arm 38. The flange 48 receives a portion of the sleeve 42 such that the arm 38 is configured to rotatably move about the pivot point 40 as the sleeve 42 rotatably moves about the pivot point 40.

Figure 7:
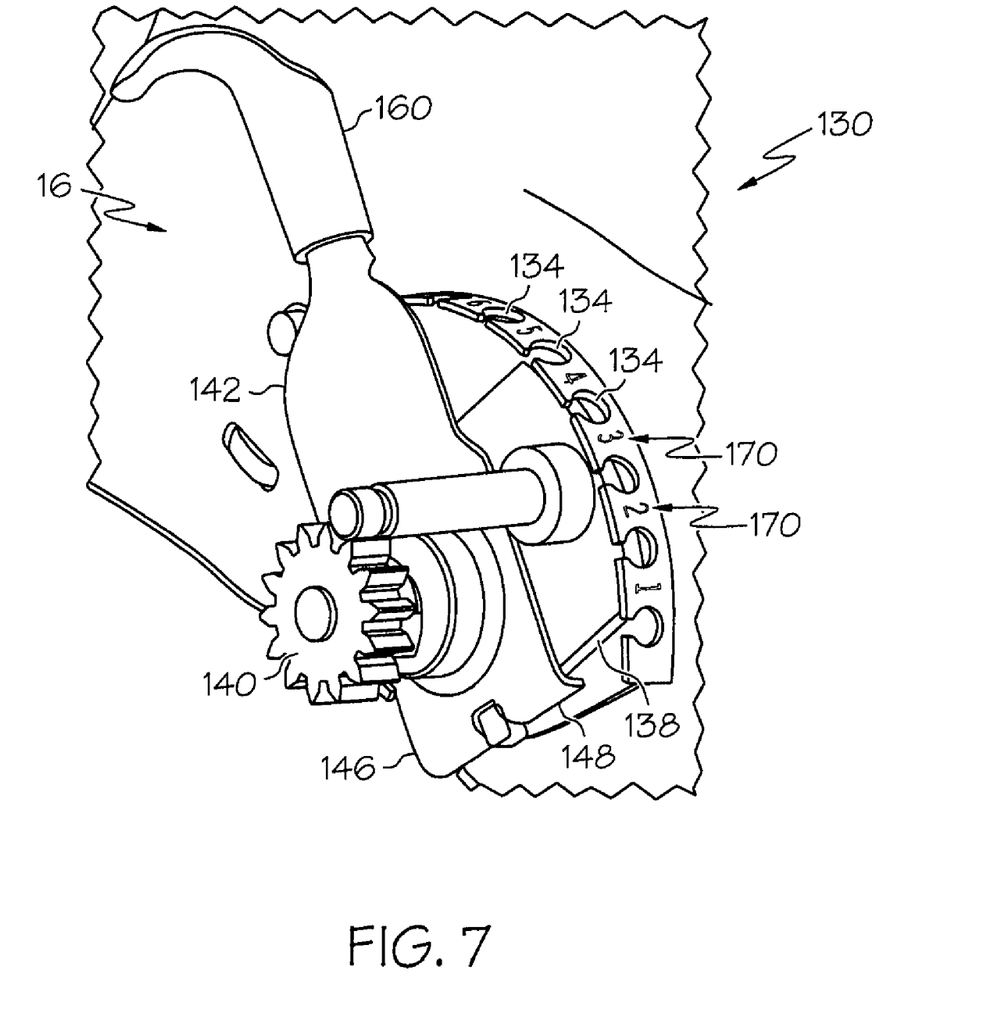
FIG. 7 is a perspective of a second example height-adjuster assembly.

In FIG. 7, a second example height-adjuster assembly 130 is configured for adjustably connecting a ground engaging wheel to a housing 16 of a mower to support the housing, a cutting assembly in the mower, and the mower. The second example height-adjuster assembly 130 can be used with the mower of FIG. 1. In the second example, a flange 148 can be located at a second end 146 of the sleeve 142, where the flange 148 receives a portion of the arm 138 such that the arm 138 is configured to rotatably move about the pivot point 140 as the sleeve 142 rotatably moves about the pivot point 140. The sleeve 142 rotatably moves in response to a user grasping a handle 160 and moving the handle 160 in a first direction to move the handle 160 and a pin within the handle from a first position to a second position. In the second example shown in FIG. 7, a bracket 132 includes different shaped retainer locations 134 than in the first example shown in FIG. 4. It is appreciated that the bracket 32, 132 in either example can include different forms of retainer locations 134. Moreover, the second example includes indicia 170 to indicate each of the various positions that the height-adjuster can be adjusted into. The first example height-adjuster assembly 30 can also include indicia 170.

The second example height-adjuster assembly 130 can also further include a spring mechanism, similar to the spring mechanism 62 in the first example, for biasing the pin into a first position within one of the plurality of retainer locations 134. Alternatively, the second example height-adjuster assembly 130 can include a flange that is similar to the flange 48 in FIG. 3, where the flange 48 is located on the arm 138. This flange 48 receives a portion of the sleeve 142. It is also appreciated that in any of the examples, the sleeve 142 can include a flange 48 and the arm 138 can include a flange 148 such that a portion of the sleeve 142 is received by the arm 138 and a portion of the arm 138 is received by the sleeve 142.

A first example method of assembling and adjusting a wheel height adjustment mechanism for a mower 10 is provided. The first example method includes the step of providing a housing 16 for a cutting assembly and a motor 14 mounted upon the housing 16 for powering the cutting assembly. The method further includes the steps of providing a ground engaging wheel 20 for the housing 16, mounting a bracket 32 to the housing 16, and rotatably mounting an arm 38 relative to the housing 16 and the bracket 32 about a pivot point 40. The method further includes the steps of fixing a sleeve 42 to the arm 38 for rotation with the arm 38 relative to the housing 16 and the bracket 32 about the pivot point 40. Another step in the first example method includes mounting a wheel mount 52 on the arm 38 at a first distance 54 from the pivot point 40. A pin 56 is inserted and then biased by a spring mechanism 62 into an interior of the sleeve 42 wherein the pin 56 is configured to move within the interior of the sleeve 42. Another step in the method is to snap a handle 60 into engagement around the pin 56.

Another step in the method is to grasp the handle 60 and move the handle 60 in a first direction to move the handle 60 and the pin 56 located within the handle 60 from a first position to a second position. The first direction can be a direction away from the bracket 32, such as a generally upwards direction. An example of the movement of the handle 60 is shown between FIG. 5 and FIG. 6. The first position, shown in FIG. 5, corresponds to an end portion 58 of the pin 56 being received in one of a plurality of retainer locations 34. When the pin 56 is received within one of the plurality of retainer locations 34 on the bracket 32, movement of the sleeve 42, the arm 38, the wheel mount 52, the handle 60, and the ground engaging wheel 20 is prevented. The end portion 58 of the pin 56 is constrained from movement by the retainer location. The second position, shown in FIG. 6, corresponds to the end portion 58 of the pin 56 not being received within any of the plurality of retainer locations 34 on the bracket 32.

In addition, the first example method includes rotatably moving the sleeve 42 from a first rotatable position to a second rotatable position while the pin 56 is in the second position such that the handle 60, the sleeve 42, the pin 56, the arm 38, the wheel mount 52, and the ground engaging wheel 20 can be rotated together to the second rotatable position about the pivot point 40 such that a desired height for the wheel mount 52 and the ground engaging wheel 20 is reached. Thus, when the pin 56 is in the second position, rotatable movement of the sleeve 42, the arm 38, the wheel mount 52, the handle 60, and the ground engaging wheel 20 is permitted. While the user holds the handle 60 in the second position, the user can rotate the handle 60 to rotate the ground engaging wheel 20 and change the cutting height of the mower 10. The bracket 32 remains stationary while the handle 60 is rotated by the user from the first rotatable position to the second rotatable position.

Figure 6:
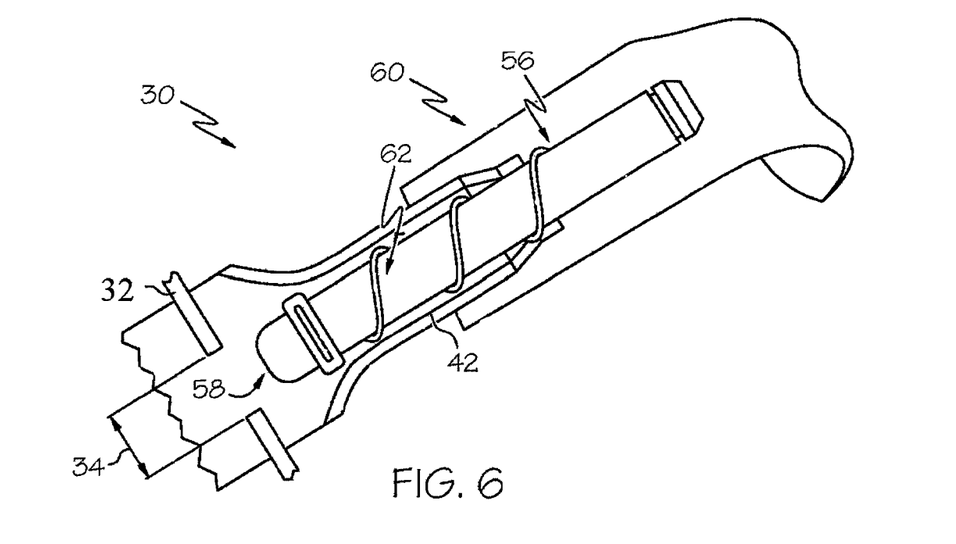
FIG. 6 is a sectional view of the handle of FIG. 4 in a second position.

Another step in the first example method is to release the handle 60 from the second position shown in FIG. 6, such that the handle 60 moves in a direction opposite the first direction and the pin 56 returns to the first position, shown in FIG. 5. The pin 56 is then received in one of the plurality of retainer locations 34 on the bracket 32 to secure the wheel mount 52 in the second rotatable position and prevent movement of the sleeve 42, the arm 38, the wheel mount 52, and the ground engaging wheel 20.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A mower having an adjustable cutting height, the mower including:
   a housing;
   a cutting assembly operatively located within the housing;
   a motor operatively mounted upon the housing for powering the cutting assembly;
   a ground engaging wheel;
   a height-adjuster assembly for adjustably connecting the ground engaging wheel to the housing for supporting the housing, the associated cutting assembly, and the motor, at an adjustable height from the ground, the height-adjuster assembly including:
   a bracket fixed to the housing, wherein the bracket is stationary and the bracket has a plurality of retainer locations;
   an arm rotatably mounted relative to the housing and the bracket about a pivot point;
   a sleeve fixed to the arm at the pivot point for rotation with the arm relative to the housing and the bracket about the pivot point, a portion of the sleeve proximate to the pivot point lying in a first plane and a portion of the arm proximate to the pivot point lying in a second plane that is different than the first plane and parallel to the first plane;
   a wheel mount operatively connected to the arm at a first distance from the pivot point; the ground engaging wheel being operatively mounted thereon, wherein rotational movement of the sleeve about the pivot point rotates the arm to move in an arc and accordingly displaces the wheel mount and the ground engaging wheel for adjustment of position of the ground engaging wheel relative to the housing, wherein the sleeve has a hollow interior extending from a manually operable end portion of the sleeve to a portion of the sleeve directed toward the bracket fixed to the housing;
   a pin located within the interior of the sleeve and movable relative to the sleeve in response to manual actuation, the pin having a first position relative to the sleeve in which an end portion of the pin is engaged with one of the plurality of retainer locations on the bracket to prevent movement of the sleeve, the arm, the wheel mount and the ground engaging wheel relative to the housing and the pin has a second position relative to the sleeve in which the end portion of the pin is not engaged with one of the plurality of retainer locations on the bracket to permit rotatable movement of the sleeve, the arm, the wheel mount and the ground engaging wheel relative to the housing;
   a handle overlaying the pin and the sleeve at the manually operable end portion wherein the handle is secured to a top portion of the pin, wherein the handle is configured to be grasped by a user for movement along a first direction wherein the movement of the handle along the first direction is configured to provide the manual actuation to move the pin from the first position into the second position where the pin is not received within any of the plurality of retainer locations;

wherein the sleeve is located on a first line that begins at the manually operable end portion and ends at the pivot point; and wherein the first line is located at an angle relative to a second line that begins at the pivot point and ends at the location of the wheel mount.

2. A mower according to claim 1, wherein the bracket has a top surface and the plurality of retainer locations are located on the top surface of the bracket.

3. A mower according to claim 2, further including a spring mechanism included within the handle wherein the spring mechanism is configured to bias the pin within the interior of the sleeve into the first position to be received within one of the plurality of retainer locations.

4. A mower according to claim 1, wherein the sleeve includes a first end and a second end;

a flange located at the second end of the sleeve wherein the flange receives a portion of the arm such that the arm is configured to rotatably move about the pivot point as the sleeve rotatably moves about the pivot point.

5. A mower according to claim 1, further including:

a flange located on the arm wherein the flange receives a portion of the sleeve such that the arm is configured to rotatably move about the pivot point as the sleeve rotatably moves about the pivot point.

6. A mower according to claim 1, wherein the handle is secured to the top portion of the pin by engagement of a snap feature located on one of the pin and the handle.

7. A mower having an adjustable cutting height, the mower including:

a housing;

a cutting assembly operatively located within the housing;

a motor operatively mounted upon the housing for powering the cutting assembly;

a ground engaging wheel;

a height-adjuster assembly for adjustably connecting the ground engaging wheel to the housing for supporting the housing, the associated cutting assembly, and the motor, at an adjustable height from the ground, the height-adjuster assembly including:

a bracket fixed to the housing, wherein the bracket is stationary and the bracket has a plurality of retainer locations;

an arm rotatably mounted relative to the housing and the bracket about a pivot point;

a sleeve fixed to the arm at the pivot point for rotation with the arm relative to the housing and the bracket about the pivot point, a portion of the sleeve proximate to the pivot point lying in a first plane and a portion of the arm proximate to the pivot point lying in a second plane that is different than the first plane and parallel to the first plane;

a wheel mount operatively connected to the arm at a first distance from the pivot point; the ground engaging wheel being operatively mounted thereon, wherein rotational movement of the sleeve about the pivot point rotates the arm to move in an arc and accordingly displaces the wheel mount and the ground engaging wheel for adjustment of position of the ground engaging wheel relative to the housing, wherein the sleeve has a hollow interior extending from a manually operable end portion of the sleeve to a portion of the sleeve directed toward the bracket fixed to the housing and the plurality of retainer locations thereon;

a pin located within the interior of the sleeve and movable relative to the sleeve in response to manual actuation, the pin having a first position relative to the sleeve in which an end portion of the pin is engaged with one of the plurality of retainer locations on the bracket to prevent movement of the sleeve, the arm, the wheel mount and the ground engaging wheel relative to the housing and the pin has a second position relative to the sleeve in which the end portion of the pin is not engaged with one of the plurality of retainer locations on the bracket to permit rotatable movement of the sleeve, the arm, the wheel mount and the ground engaging wheel relative to the housing;

a handle overlaying the pin and the sleeve at the manually operable end portion wherein the handle is secured to a top portion of the pin, wherein the handle is configured to be grasped by a user for movement along a first direction wherein the movement of the handle along the first direction is configured to provide the manual actuation to move the pin from the first position into the second position where the pin is not received within any of the plurality of retainer locations;

a spring mechanism included within the handle wherein the spring mechanism is configured to bias the pin within the interior of the sleeve into the first position to be received within one of the plurality of retainer locations;

wherein the sleeve is located on a first line that begins at the manually operable end portion and ends at the pivot point;

wherein the first line is located at an angle relative to a second line that begins at the pivot point and ends at the location of the wheel mount; and a flange located on the arm wherein the flange receives a portion of the sleeve such that the arm is configured to rotatably move about the pivot point as the sleeve rotatably moves about the pivot point.

8. A mower according to claim 7, wherein the bracket has a top surface and the plurality of retainer locations are located on the top surface of the bracket.

9. A mower according to claim 7, wherein the handle is secured to the top portion of the pin by engagement of a snap feature located on one of the pin and the handle.

10. A method of assembling and adjusting a wheel height adjustment mechanism for a mower including the steps of:

providing a housing for a cutting assembly and a motor mounted upon the housing for powering the cutting assembly;

providing a ground engaging wheel for the housing;

mounting a bracket to the housing;

rotatably mounting an arm relative to the housing and the bracket about a pivot point;

fixing a sleeve to the arm at the pivot point for rotation with the arm relative to the housing and the bracket about the pivot point, a portion of the sleeve proximate to the pivot point lying in a first plane and a portion of the arm proximate to the pivot point lying in a second plane that is different than the first plane and parallel to the first plane;

mounting a wheel mount on the arm at a first distance from the pivot point;

inserting a pin biased by a spring mechanism into an interior of the sleeve wherein the pin is configured to move within the interior of the sleeve;

snapping a handle into engagement around the pin;

grasping the handle and moving the handle in a first direction to move the handle and the pin located within the handle from a first position to a second position; wherein the first position corresponds to an end portion of the pin being received in one of a plurality of retainer locations on the bracket to prevent movement of the sleeve, the arm, the wheel mount, and the ground engaging wheel, and the second position corresponds to the end portion of the pin not being received within any of the plurality of retainer locations on the bracket to permit rotatable movement of the sleeve, the arm, the wheel mount and the ground engaging wheel;

rotatably moving the sleeve from a first rotatable position to a second rotatable position while the pin is in the second position such that the handle, the sleeve, the pin, the arm, the wheel mount, and the ground engaging wheel can be rotated together to the second rotatable position about the pivot point such that a desired height for the wheel mount and the ground engaging wheel is reached; and releasing the handle such that the handle moves in a direction opposite the first direction and the pin returns to the first position where the pin is received in one of the plurality of retainer locations on the bracket to secure the wheel mount in the second rotatable position and prevent movement of the sleeve, the arm, the wheel mount, and the ground engaging wheel.

11. The method according to claim 10, wherein the sleeve is located on a first line that begins at the end portion of the pin and ends at the pivot point, further wherein the first line is located at an angle relative to a second line that begins at the pivot point and ends at the location of the wheel mount.

* * * * *